March 12, 1963  G. R. CHURCHILL  3,080,689
BUFFING WHEEL
Filed Feb. 2, 1959  8 Sheets-Sheet 1

INVENTOR.
George R. Churchill
BY Robert R. Churchill
ATTORNEY

March 12, 1963 G. R. CHURCHILL 3,080,689
BUFFING WHEEL
Filed Feb. 2, 1959 8 Sheets-Sheet 2

INVENTOR.
*George R. Churchill*

BY *Robert L. Churchill*

ATTORNEY

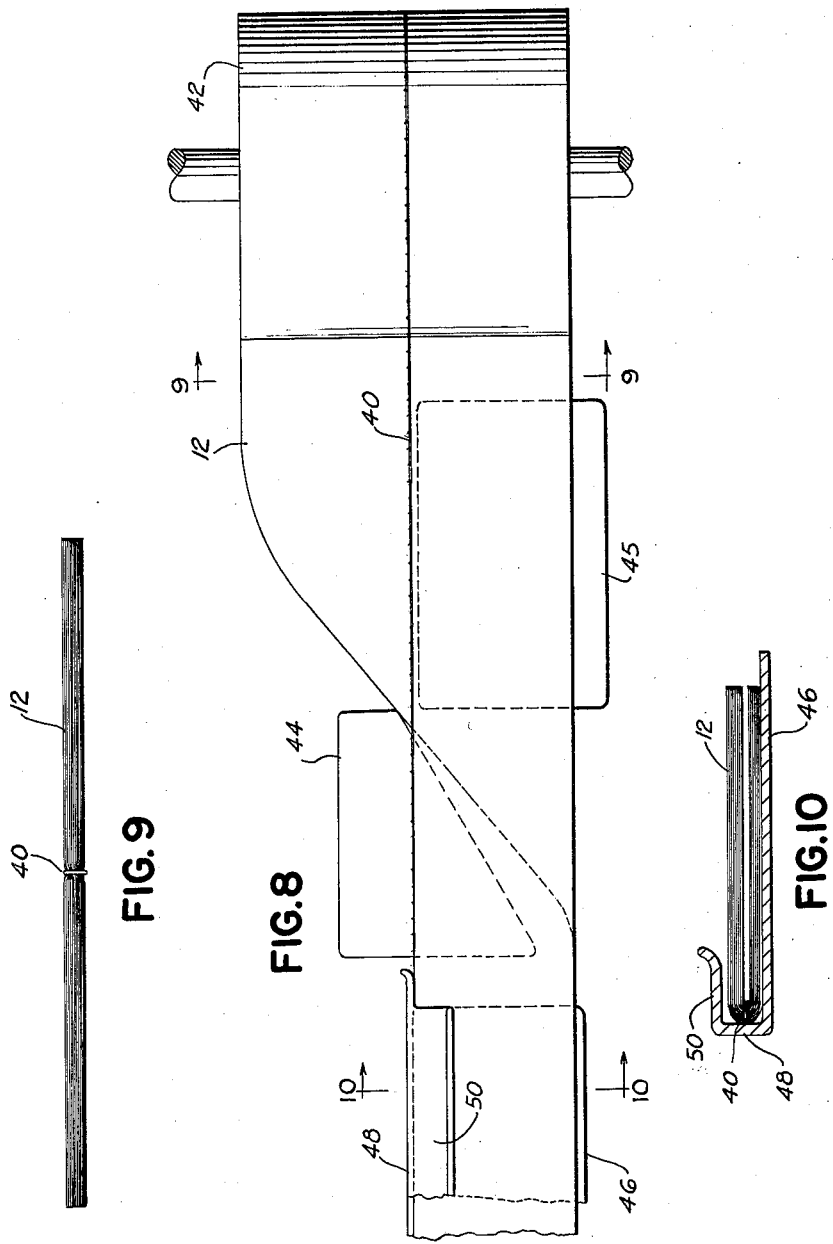

March 12, 1963 G. R. CHURCHILL 3,080,689
BUFFING WHEEL

Filed Feb. 2, 1959 8 Sheets-Sheet 4

INVENTOR.
*George R. Churchill*

BY *Robert R. Churchill*

ATTORNEY

March 12, 1963 G. R. CHURCHILL 3,080,689
BUFFING WHEEL
Filed Feb. 2, 1959 8 Sheets-Sheet 6

INVENTOR.
George R. Churchill
BY Robert R. Churchill
ATTORNEY

March 12, 1963 G. R. CHURCHILL 3,080,689
BUFFING WHEEL
Filed Feb. 2, 1959 8 Sheets-Sheet 8
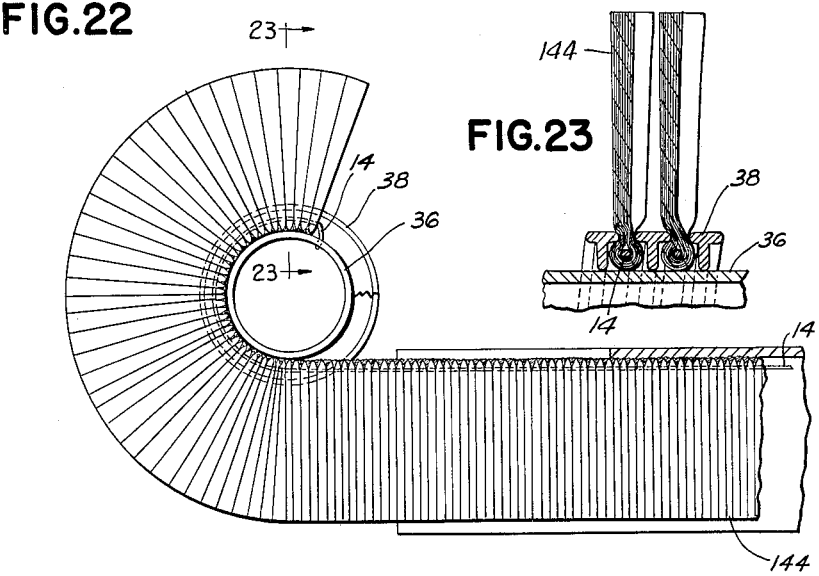
FIG.22
FIG.23
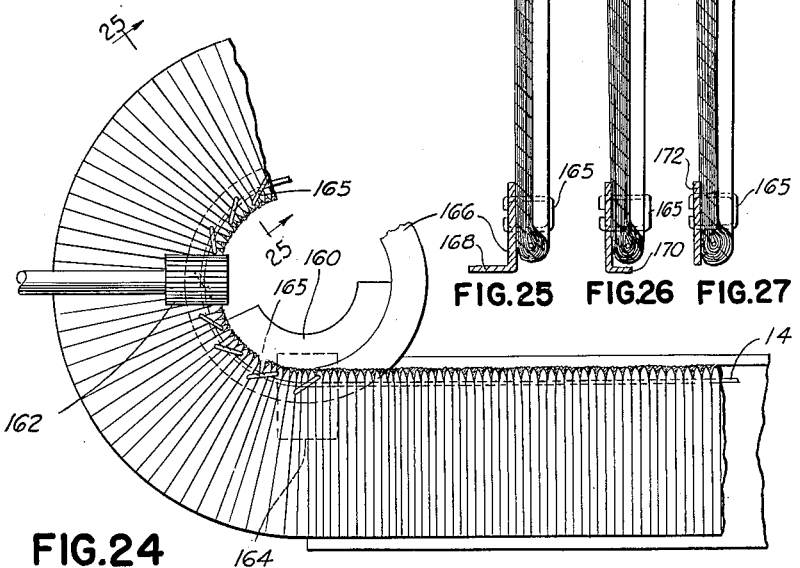
FIG.24
FIG.25  FIG.26  FIG.27
INVENTOR.
George R. Churchill
BY Robert R. Churchill
ATTORNEY

3,080,689
BUFFING WHEEL

George R. Churchill, Cohasset, Mass., assignor to George R. Churchill Company, Inc., Hingham, Mass., a corporation of Massachusetts
Filed Feb. 2, 1959, Ser. No. 790,560
8 Claims. (Cl. 51—193)

This invention relates to a buffing element and an apparatus for making the same.

The invention has for an object to provide a novel and improved buffing element for use in making a buffing wheel or roll and which is characterized by novel structure and may be economically produced.

The invention has for another object to provide a novel and improved apparatus for producing a corrugated buffing element for the purpose defined in a simple and economical manner.

A further object of the invention is to provide novel and improved apparatus for producing a buffing element of the type specified in a rapid, efficient and economical manner.

With these general objects in view and such others as may hereinafter appear, the invention consists in the buffing element and in the apparatus for producing the same as hereinafter described and particularly defined in the claims at the end of this specification.

In the drawings illustrating the preferred embodiment of the invention:

FIG. 8 is a plan view of a portion of the apparatus for producing the present buffing element;

FIG. 9 is a vertical section taken on the line 9—9 of FIG. 8 showing a multi-ply cloth web stitched along a central line;

FIG. 10 is a vertical section on the line 10—10 of FIG. 8 showing the cloth web folded upon itself;

Figure 11:
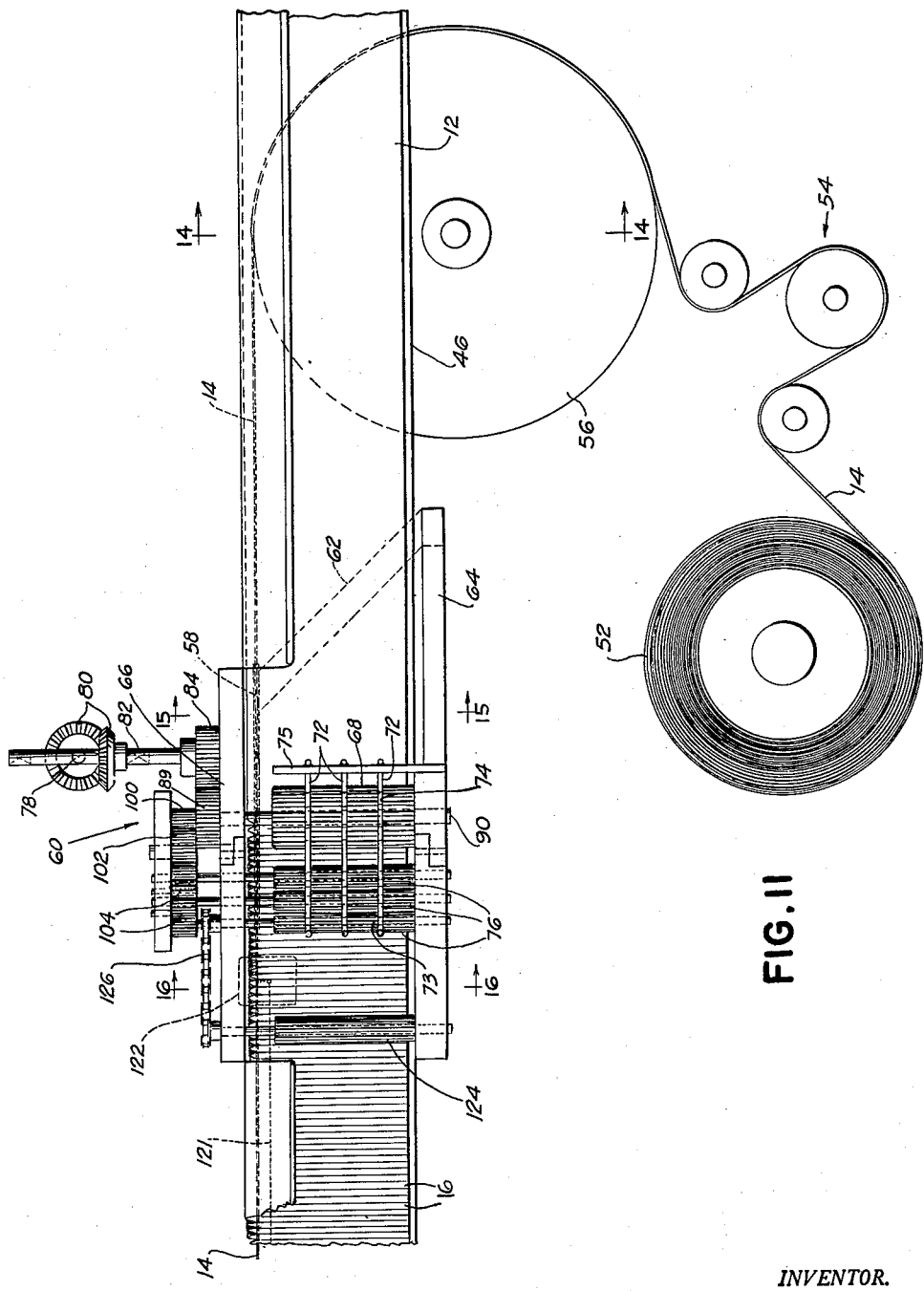
FIG. 11 is a plan view of another portion of the apparatus for producing the corrugated buffing element and comprises a continuation of the view shown in FIG. 8.
Figure 14:
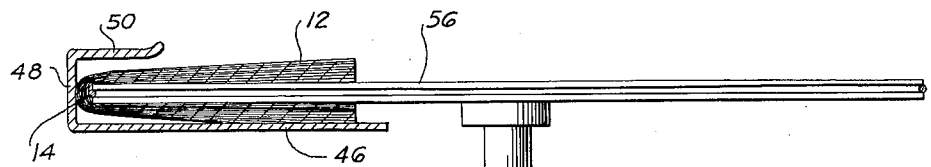
Figure 15:
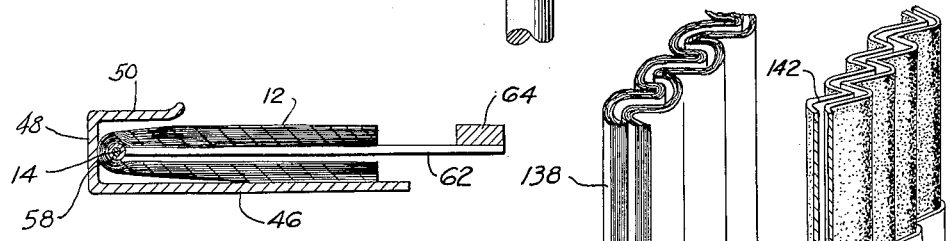
Figures 20, 21:
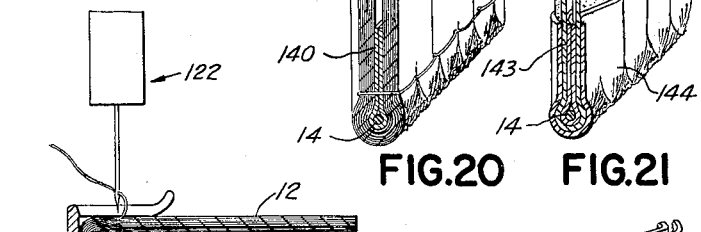
Figure 16:
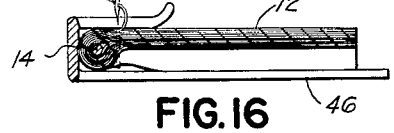
Figure 17:
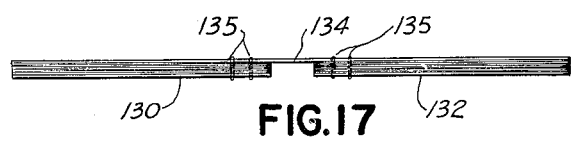
Figure 21A:
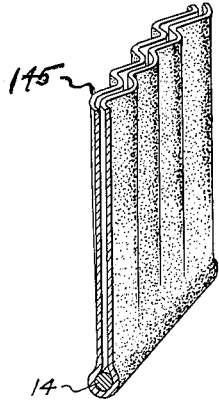
Figure 18:
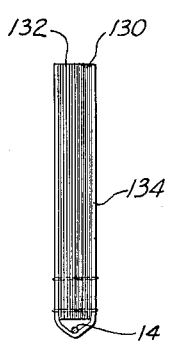
Figure 19:
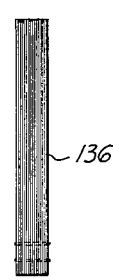

FIGS. 14, 15 and 16 are vertical cross sections taken on the lines 14—14, 15—15 and 16—16, respectively, of FIG. 11;

FIG. 17 is an end view of a modified form of multi-ply cloth web from which the present corrugated element may be produced;

FIG. 18 is an end view showing the web of FIG. 17 folded upon itself;

FIG. 19 is an end view of an unfolded multi-ply web which may be employed in producing the present corrugated buffing element;

FIG. 20 is a perspective view partly in cross section of another modified form of a corrugated buffing element produced in accordance with the present invention;

FIG. 21 is a perspective view illustrating partly in cross section still another form of corrugated material produced in accordance with the present invention;

FIG. 21a is a perspective view illustrating partly in cross section a still further form of corrugated material produced in accordance with the present invention;

FIG. 22 is a plan view illustrating the present corrugated strip being helically wound and clamped upon a tubular core to produce a buffing roll;

FIG. 23 is a detail view in vertical cross section taken on the line 23—23 of FIG. 22;

FIG. 24 is a plan view illustrating the present corrugated strip being stapled to a helical metal band from which a buffing wheel section or roll may be produced;

FIG. 25 is a detail view in vertical cross section taken on the line 25—25 of FIG. 24; and FIGS. 26 and 27 are similar views illustrating modified forms of the stapled buffing element shown in FIG. 25.

In general the present invention contemplates a novel and improved buffing element for use in making a buffing wheel or roll. The illustrated buffing element comprises an elongated strip of buffing material provided with transversely extended, substantially uniform corrugations closely compacted together. In practice an elongated web of multi-ply cloth or other known surface treating material may be folded transversely upon itself along a longitudinal center line to provide a strip, U-shaped in cross section. Preferably, an elongated wire may be extended within the folded edge for guiding and controlling the strip during the corrugating operation. Provision is also made for securing and retaining the corrugations in their compacted condition.

In one embodiment of the invention the corrugated structure may be retained in its closely compacted or contracted condition by stitching passing through the cloth in a direction perpendicular to the direction of the corrugations. In another embodiment of the invention the corrugated strip may be stapled to a metal band so that the staples serve to retain the corrugations in their compacted condition. In still another embodiment of the invention the elongated strip of corrugated buffing material may be helically wound upon a tubular core member and clamped thereto to retain the corrugations in their uniformly compacted condition.

Figure 1:
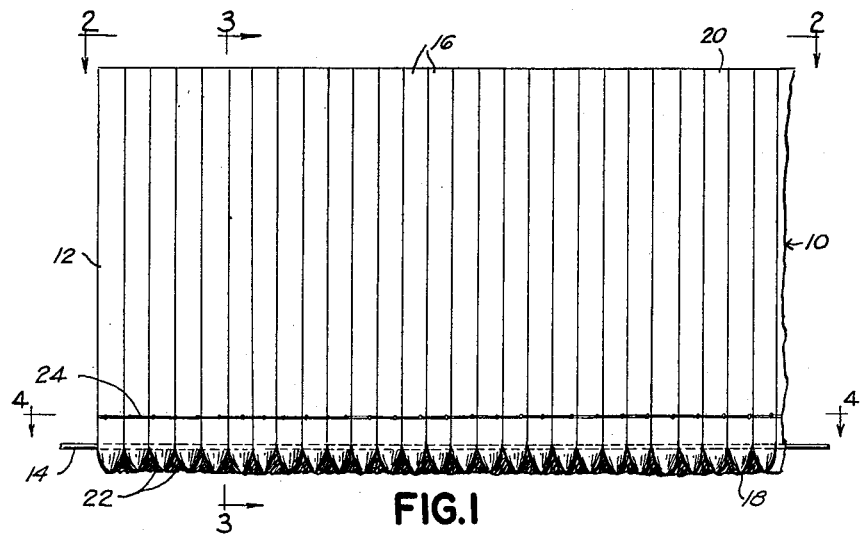
FIG. 1 is a side elevation of a buffing element comprising a multi-ply cloth strip of corrugated buffing material produced in accordance with the present invention.
Figure 2:
FIG. 2 is a plan view of the same.
Figure 3:
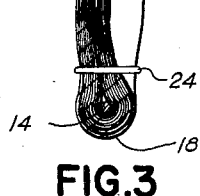
FIG. 3 is a vertical cross section taken on the line 3—3 of FIG. 1.
Figure 4:
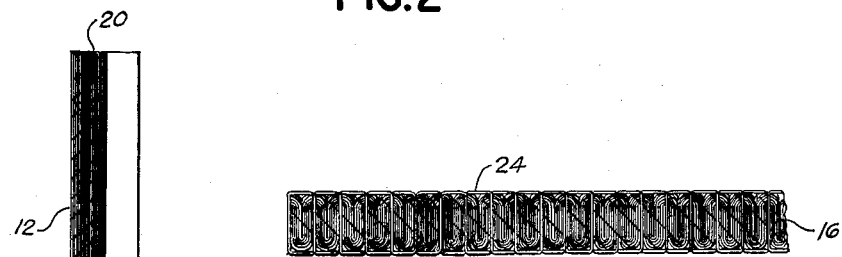
FIG. 4 is a horizontal section taken on the line 4—4 of FIG. 1.

Referring now to the drawings, FIG. 1 illustrates a strip 10 of corrugated buffing material produced in accordance with the present invention and which may comprise a single or multi-ply or laminated web of cloth or other buffing material 12 folded medially upon itself about a wire 14 and provided with substantially uniform, longitudinally contracted or compressed corrugations 16, as shown in FIG. 2. In the embodiment of the invention shown in FIG. 1 the corrugations 16 extend uniformly transversely of the strip from a point immediately above the wire 14 extended within the folded edge 18 of the strip to the outer or opposite edge 20 of the strip, the material below the wire along the folded edge being closely gathered or puckered together as indicated at 22. The corrugations may be maintained in their closely compacted condition by stitching 24 passing through the corrugations, as shown in FIG. 4, along a line above the wire 14.

Figure 5:
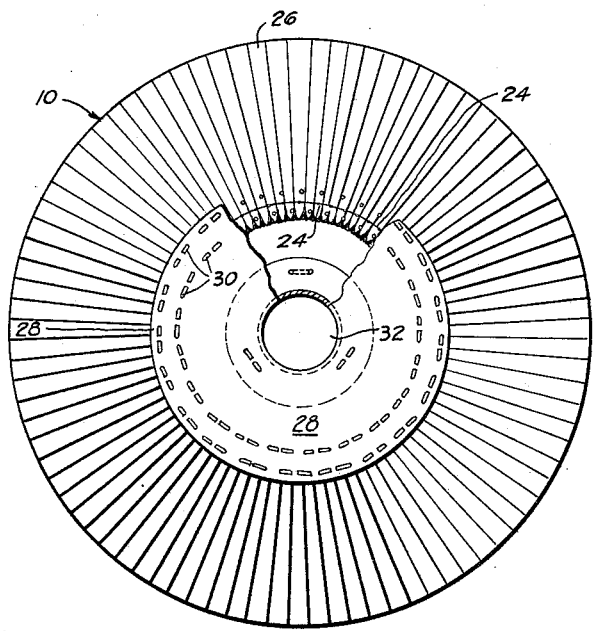
FIG. 5 is a side elevation partly broken away of a buffing wheel section embodying the corrugated buffing material shown in FIG. 1.
Figure 6:
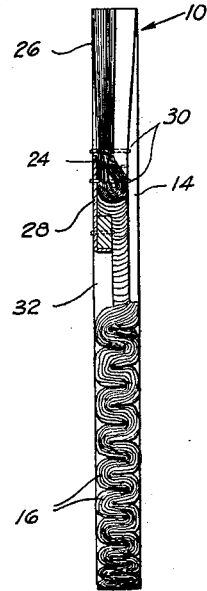
FIG. 6 is an end view of the same partly in vertical cross section.
Figure 7:
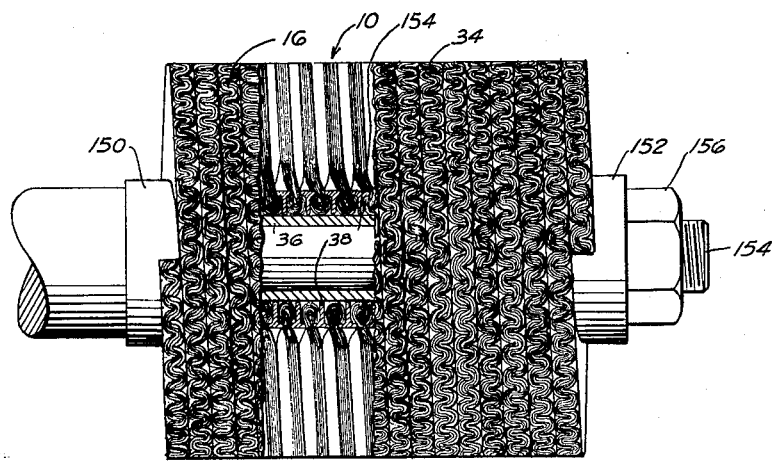
FIG. 7 is a side elevation of a spirally wound buffing roll embodying an elongated strip of the corrugated buffing material shown in FIG. 1.

The corrugated strip of buffing material 10 thus prepared may be cut to length and formed into a ring 26, as shown in FIGS. 5 and 6, which may be secured to a metal disk 28 by staples 30, the disk 28 being provided with a central flanged opening 32 for mounting the ring or single section buffing wheel on an arbor together with similar sections which may be clamped together to produce a relatively wide buffing wheel. FIG. 7 illustrates another form of buffing wheel or roll 34 which may be produced with the present buffing element wherein an elongated strip of corrugated buffing material may be helically wound upon a tubular core member 36 between the convolutions of a springlike metal member 38, and thereafter the spring may be compressed to grip and retain the corrugated material therebetween.

Referring now to FIGS. 8 to 16 illustrating the apparatus for producing the buffing element 10 shown in FIG. 1, a multi-ply web of cloth 12, preferably secured together medially and longitudinally thereof by stitching 40, may be withdrawn from a supply roll 42 thereof and passed between folding plates 44, 45 to fold the web transversely upon itself providing a strip U-shaped in cross section, the folded strip being advanced into a supporting guide 46 having an upstanding rear edge 48 and an overlying curved portion 50 as shown in FIG. 10.

As illustrated in FIG. 11, which comprises a continuation of FIG. 8, provision is made for applying the wire 14 within the folded strip 10 as the latter is advanced through the supporting guide 46. As herein shown, the wire may be withdrawn from a supply roll 52 and passed through a wire straightening device indicated generally at 54 and around a guide wheel 56 which extends between the sides of the folded strip to dispose and align the wire within the folded edge, as shown in cross section in FIG. 14. The wire 14 is arranged to pass through a small diameter stationary guide tube 58 prior to passing into the corrugating mechanism, indicated generally at 60, the folded strip being advanced over the stationary tube during the corrugating operation. As illustrated in FIG. 15, the tube 58 may be supported by a plate 62 extended between the folded strip and attached to a frame member 64. In operation the guide tube 58 retains the folded edge of the strip firmly against a backing plate 66 during the corrugating operation.

Figure 12:
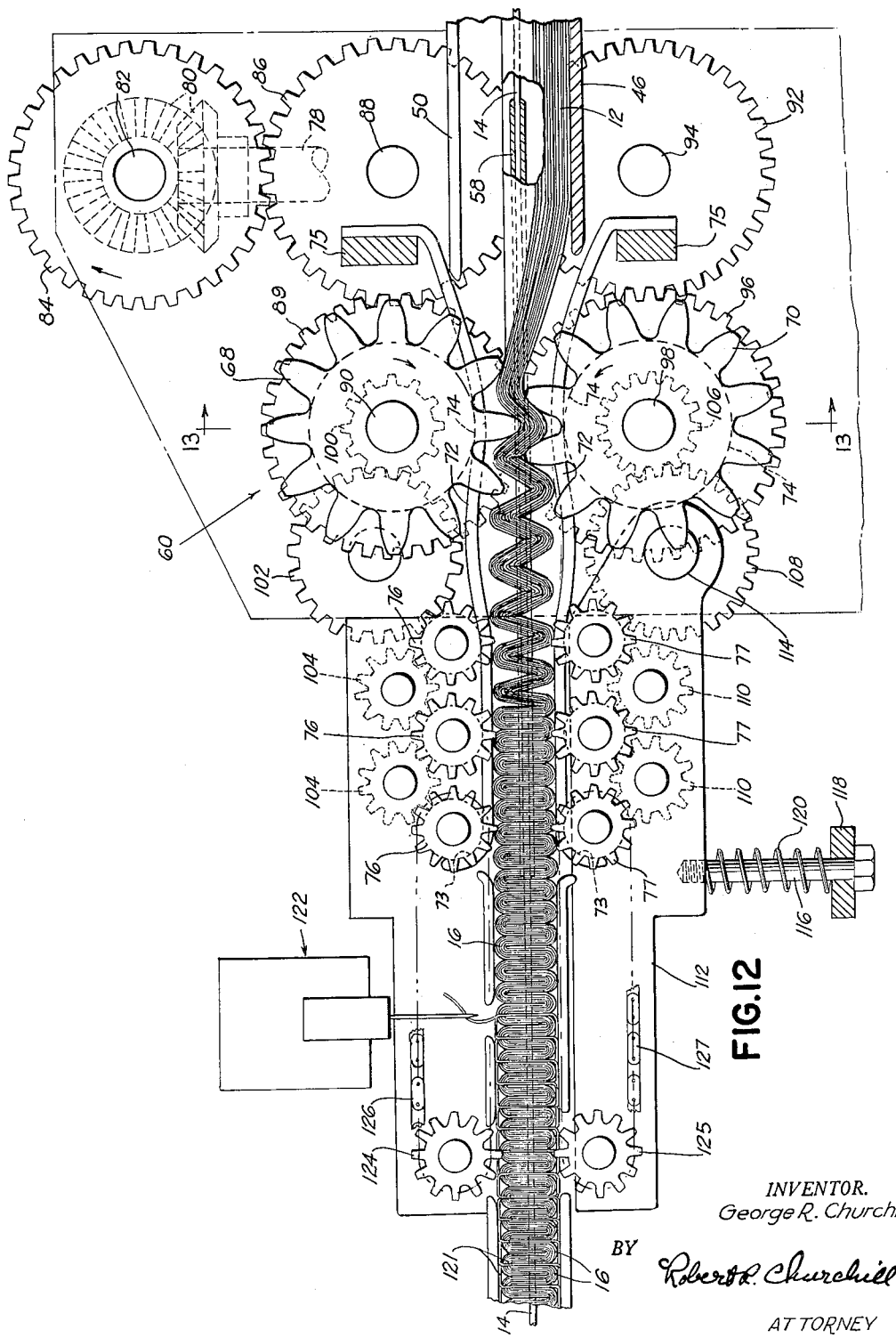
FIG. 12 is a front elevation at a larger scale of a portion of the apparatus shown in FIG. 11.
Figure 13:
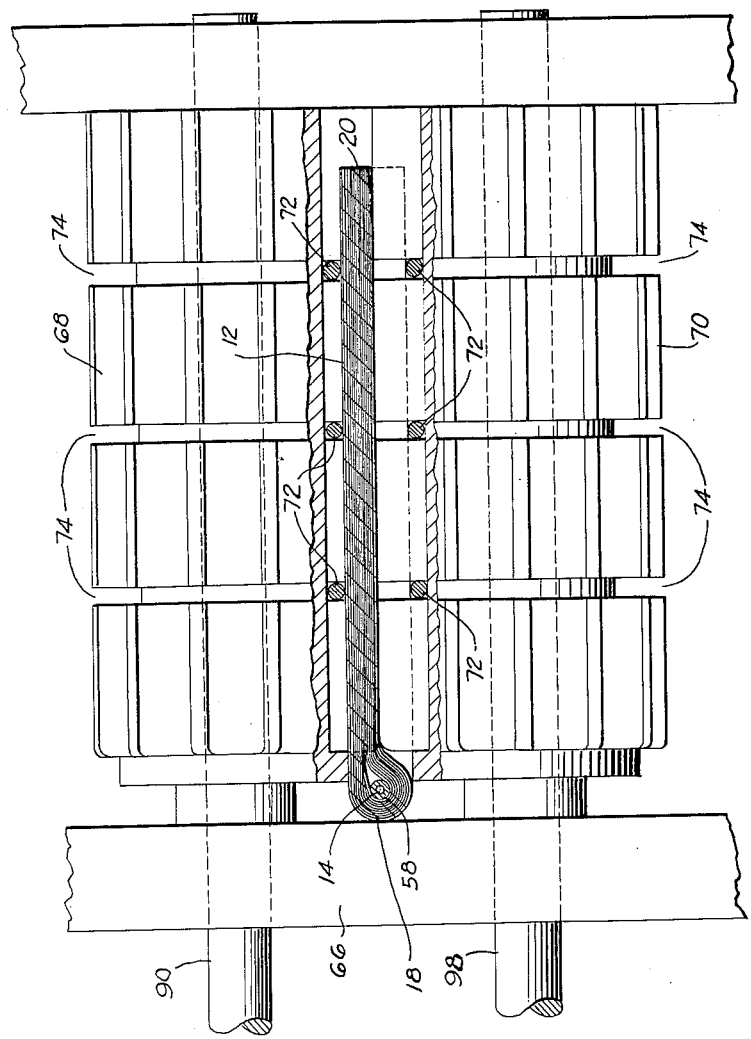
FIG. 13 is a vertical section taken on the line 13—13 of FIG. 12.

The continuously advancing folded strip then passes between upper and lower driven corrugating gears 68, 70 illustrated in detail in FIGS. 12 and 13 which cooperate to shape the multi-ply material as it passes therebetween to provide uniform transverse open corrugations therein from a point spaced a short distance from the guide tube 58 over which the folded edge is wrapped to the opposite marginal edge of the strip. Successive open corrugations or reverse folds are formed by the tooth of one gear cooperating with the hollow or space between the teeth of the opposing gear providing in effect successive transverse corrugations in the buffing material. It will be observed that while the corrugating gears are of equal diameter and of equal pitch the gear centers are spaced apart so that the outside diameter of one gear is tangent to the outside diameter of the other gear providing a space between the point of one gear and the hollow of its opposing gear into which the multi-ply thickness of the buffing material is compressed to produce successive substantially uniform corrugations transversely throughout substantially the full width of the material. In order to prevent the material from being jammed between the teeth and carried around with the gears, spaced upper and lower guide rods 72 are provided which extend between grooves 74 formed in the gears to a depth of the bottom diameter of the gear teeth as shown. Thus, the material is prevented from being jammed into the bottom of the space between the teeth and is stripped away from the gear teeth as it passes beyond the corrugating gears. It will be observed that the guide rods 72 are curved outwardly slightly immediately beyond the corrugating gears to permit clearance for the corrugated material to be gradually stripped away from the teeth as it leaves the corrugating gears. It will be understood that the folded edge of the material wrapped about the stationary tube 58 is free to slide along the tube and to be compressed longitudinally into puckered relation as the extended portions of the material are provided with substantially uniform transverse corrugations.

The guide rods 72 are then curved inwardly again to assume their normal spaced relation to control the width of the element and to guide the material with its open folds or corrugations between a series of upper and lower driven retarding gears 76, 77, respectively, which are arranged to be driven at a slower rate of speed than the corrugating gears and operate to hold the material back so that the open corrugations are gradually compressed together and compacted into closely spaced relation as shown in FIG. 12.

The drive for the gear indicated in FIGS. 11 and 12 may be taken from a vertical drive shaft 78 which may be rotated from any usual source of power, such as an electric motor, not shown. The drive shaft 78 may be connected by bevel gears 80 to a horizontal shaft 82 having a spur gear 84 which meshes with a gear 86 on shaft 88. Gear 86 is in mesh with a gear 89 fast on the upper corrugating gear shaft 90 to drive the upper corrugating gear 68 in a clockwise direction. The gear 86 also meshes with a gear 92 on a shaft 94 which in turn meshes with a gear 96 fast on a lower corrugating gear shaft 98 for driving the lower corrugating gear 70 in a counterclockwise direction.

The upper and lower series of retarding gears 76, 77 are driven from the respective corrugation gear shaft 90, 98 as shown. The upper corrugating gear shaft 90 is provided with a pinion 100 which is operatively connected by an idler gear 102 to the first one of the series of upper retarding gears 76 to rotate the same in a clockwise direction at a slower rate of linear speed than the linear speed of the corrugating gear, and the second and third upper retarding gears 76 are connected to the first gear by idler gears 104 to effect rotation of the gears 76 in a clockwise direction. The lower series of retarding gears 77 are similarly driven in a counterclockwise direction through pinion 106, idler 108, first retarding gear 77 and idler gears 110 connecting the first gear 77 to the second and third gears in the series. It will be observed that the rods 72 also extend through grooves 73 formed in the retarding gears 76, 77 and serve to guide and maintain the corrugations at a uniform width as the corrugated strip is compressed and advanced therebetween. The rods 72 may be connected at one end to frame members 75, the other ends being curved around the endmost upper and lower retarding gears 76, 77, respectively, as shown.

From the description thus, it will be seen that in operation the multi-ply or laminated cloth strip folded upon itself is provided with open corrugations by the corrugating gears 68 and 70, and as the corrugated material is advanced through the retarding gears 76, 77, the teeth thereof project into the edges of the corrugations to retard the linear speed of the strip relative to the speed at which the strip passes through the corrugating gears so that in operation the open corrugations are gradually closed to longitudinally contract and compress the corrugations together as shown in FIG. 2. It will be understood that as the corrugations are longitudinally compressed by the retarding action of the gears 76, 77, the folded edge of the material wrapped about the stationary tube 58 may be further longitudinally compressed and puckered. The strip may preferably be longitudinally contracted an amount equal to from one-half to one-forth of its normal uncorrugated length, and in this manner the density of the buffing face of the buff may be varied to form a harder or softer buff whenever desired. In practice a one-third contraction of the strip provides a buffing face of a density commonly utilized in the buffing industry. However, in some cases the strip may be contracted to more than one-forth of its uncorrugated length. The number of corrugations per linear inch of the strip is dependent upon the relative speed of the corrugating gears with respect to the retarding gears, and in this manner the density of the buffing face may be varied. The density may also be varied by varying the number of plies of buffing material used in forming the strip. While in some instance single or multiply strips having a few plies may be utilized, the strip may preferably comprise from eight to eighteen plies of the buffing material.

In the illustrated embodiment of the invention at least one of the brackets carrying the retarding gears, herein shown as the lower bracket 112, may be pivotally mounted at 114 and spring pressed upwardly to urge the projecting teeth of the retarding gears into operative engagement with the edges of the corrugations. Thus, in the event that a relatively thicker portion of folded material, such as a spliced portion thereof, is passed between the gears, or in the event a rigid member is inadvertently passed between the retarding gears, the bracket may yield to prevent damage to the gears. As herein shown, a stud 116 extended through a clearance opening in a frame member 118 is threadly secured to the underside of the bracket 112, and a spring 120 coiled about the stud 116 is interposed between the frame member and the bracket as shown. In the illustrated embodiment of the invention the corrugating gears 68, 70 extend transversely of the direction of movement of the material from a point spaced outwardly from the folded edge a short distance beyond the wire 14 and the stationary tube 58 as shown.

In the embodiment of the invention shown in FIG. 12 provision is made for securing the corrugations in their contracted condition by stitching indicated at 121, and as herein diagrammatically indicated, a stitching head 122 is arranged to apply the stitching through and around the corrugations to retain them in their compacted condition. It will be observed that when the closely compacted corrugated strip passes beyond the retarding gears the folded edge slides off the stationary tube 58 and is again engaged with the wire 14. In order to maintain the corrugations in their closely compacted condition during the stitching operation, a pair of auxiliary retarding gears 124, 125 is disposed beyond the stitching head and may be driven from the endmost pair of the series of retarding gears 76, 77 by chain and sprocket drives 126, 127, respectively. The elongated strip of corrugated buffing material thus prepared may be rolled up and stored for future use in making buffing wheels of the type shown in FIGS. 5 and 7. It will be seen that the stitching applied along a line spaced from the lower or folded edge and edge and above the wire 14, the extended portions of the corrugations being free to open or expand uniformly when the strip is subsequently formed into a ring or spirally wound upon a core member to produce the buffing wheel or roll.

In the above-described embodiment of the invention the buffing element is produced from a web of laminated or multi-ply cloth which may be stitched together along a medial line as shown in FIG. 9. However, the stitching 40 may be omitted if desired. In a modified embodiment of the invention, as shown in FIGS. 17 and 18, the material may comprise two multi-ply webs of cloth 130, 132 connected in spaced relation to one or more outer webs 134 by stitching 135, the material being folded inwardly upon itself, as shown in FIG. 18, and provided with corrugations in the manner above described. FIG. 19 illustrates a further modification wherein a relatively narrower unfolded web of multi-ply buffing material 136 may be provided with corrugations in the manner above described. FIG. 20 illustrates a folded and corrugated strip 138 which is provided with an inner cardboard filler 140 for producing a strip of slightly greater thickness than the normal thickness thereof. FIG. 21 illustrates a strip of abrasive material 142 commonly referred to as "grit cloth" which comprises a loosely woven fabric material treated by impregnating it with silicon carbide or aluminum oxide and which has been corrugated in accordance with the present invention and provided with inner and outer shield elements 143 and 144; and FIG. 21a illustrates a corrugated strip 145 of abrasive material similar to that illustrated in FIG. 21 in which the shield elements 143 and 144 have been omitted.

The apparatus shown in FIGS. 8 to 16 contemplates the retention of the corrugations in their longitudinally compressed and closely compacted condition by stitching passing through the material and in a direction perpendicular to the direction of the corrugations. However, the present invention also contemplates other preferred means for retaining the corrugations in their closely compacted condition, one such means being illustrated in FIG. 22 wherein the corrugated strip 144, produced in the manner shown in FIGS. 11 and 12, but without the stitching 121, may be wound directly onto a hollow core member 36 between the convolutions of a clamping spring 38 (see FIG. 23) to produce a buffing roll of the type shown in FIG. 7. In practice the free end of the wire 14 may be secured to the hollow core member 36, and the latter may be rotated in timed relation to the advance of the material being produced by the corrugating mechanism. When the roll is completely wound the strip may be severed, and thereafter the spring 38 may be compressed to grip and retain the corrugated material therebetween, preferably by recessed end collars 150, 152 in the manner illustrated in FIG. 7. In use the completed buffing roll thus assembled is adapted to be mounted on an arbor 154 and secured thereto by a nut 156.

Another preferred expedient contemplated by the present invention for retaining the corrugations in their uniformly compacted condition is illustrated in FIG. 24 wherein the strip of corrugated material produced by the apparatus shown in FIG. 12, but without stitching, may be stapled directly to a helically shaped springlike metal band. In operation the folded edge of the corrugated material may be guided into superimposed relation to the metal band around a curved guide member 160, and the superimposed strip and band may be rotated and advanced by suitable serrated feed rollers, one of which is shown at 162, to intermittently advance the material past a stapling head indicated generally at 164.

As herein illustrated, the staples 165 may be set at an angle to permit close spacing of the staples when desired and are preferably applied through the corrugations at a point beyond the wire 14. The helical stapled strip thus produced may be secured to a tubular core member to provide a buffing roll, or a section of the helical material may be cut off to provide a ring for producing a single section buffing wheel. In some instances it may be desirable to provide a plurality of rows of staples to secure the corrugated strip to the helical metal band, and the rows may be set substantially parallel to the wire 14.

A preferred form of helical metal band to which the present corrugated buffing element may be stapled is L-shaped in cross section, as indicated at 166 in FIG. 25, and having an outwardly extended leg or flange 168. The strip may be secured to a tubular core member at the flange portion.

When single section buffing wheels are to be formed from a length of the buffing material stapled to a metal band, the helically formed metal bands may take the form shown in cross section in either FIGS. 26 or 27, FIG. 26 showing an inwardly bent flange 170 to add rigidity to the band, and FIG. 27 showing a flat band 172. The structure and method of fastening the corrugated strip to the helical metal band forms a portion of the subject matter of and is claimed in my copending application, Serial No. 814,750, filed May 21, 1959.

From the above description it will be seen that the present corrugated buffing element in a preferred embodiment of the invention provides uniform and closely compacted transverse corrugations in a multi-ply web of cloth or other buffing or known surface treating material folded upon itself wherein the corrugations extend uniformly from a point spaced outwardly a short distance from the folded marginal edge to the opposite marginal edge of the folded strip, the material along the folded edge assuming a gathered or puckered condition. It will also be observed that provision is made for retaining the corrugations in their longitudinally compressed condition by means cooperating with the inner portion of the strip along a line spaced outwardly from the folded edge, either by stitching extended through the corrugations, or by the other means heretofore described. In a modified embodiment of the invention the material may comprise a multi-ply strip of unfolded cloth or other buffing material which may be provided with transverse corrugations, as above defined, and which extend throughout the full width thereof.

It will be observed that the present strip of corrugated buffing material is economical to manufacture and enables economical, highly efficient buffing rolls or sections to be produced. The buffing face of the buffing rolls or sections embodying the present buffing material comprises a plurality of uniform corrugations which pick up the buffing compound uniformly across the face of the buff and, consequently, enable the buff to perform in a highly efficient manner. The uniformity of the corrugations produced in accordance with the present invention also permits the corrugations to fan out and expand uniformly when the strip is formed into a helix or a ring so as to maintain a substantially uniform width in its assembled form. It will also be observed that because of the uniformity of the corrugations the outer or peripheral surface of the buffing wheel or roll produced with the present corrugated buffing element presents a continuous uniform buffing surface of substantially uniform density for performing the buffing operation. In practice the number of plies of cloth may be varied to form buffing surfaces of different densities, or the spacing of the convolutions or individual sections assembled on an arbor may be varied to produce a hard or a soft buffing surface.

In practice it is preferred to extend a wire 14 within the folded edge of the U-shaped buffing material to afford better control of the lengthwise movement or advance of the material to hold the material down and to prevent lateral outward displacement thereof. The wire 14 is also of particular advantage for use when the U-shaped corrugated material is helically wound directly onto a tubular core member between the convolutions of a clamping spring wherein the free end of the wire may be first secured to the core member. However, in its broader aspects the present invention contemplates production of the corrugated buffing element either in its U-shaped form or in its unfolded condition without the use of a wire, particularly in the embodiment of the invention wherein the corrugations are stitched to retain them in their contracted and compressed condition. When the U-shaped material is produced without a wire, the folded edge of the material passes over the stationary rod 58 to hold the material down during the corrugating operation.

In some instances it may be preferred to dampen the buffing material prior to corrugating the same so that when the subsequently corrugated strip is dried the corrugations will be more firmly set and relatively rigid, particularly when the material is initially provided with a starch or like filler.

It will be understood that wherever the term "buffing" element or material is used herein, it is intended to mean a surface treating material capable of polishing, buffing and/or abrading, and whenever the term "buffing wheel" is used it is intended to mean a single section or a buffing roll.

While the preferred embodiment of the invention has been herein illustrated and described, it will be understood that the invention may be embodied in other forms within the scope of the following claims.

Having thus described the invention, what is claimed is:

1. A corrugated buffing element comprising an elongated continuous rectangular strip of buffing material for use in making a buffing wheel, said strip being longitudinally folded upon itself with the overlying layers thereof jointly folded to form transverse uniform corrugations lying against each other with the major portions thereof extending perpendicular to the general plane of said strip, a wire extending within the folded edge of said strip, the material at the folded edge of said strip being randomly gathered about said wire and compressed in a longitudinal direction, said corrugations extending only from a position adjacent but spaced from said wire to the opposite edge of said strip.

2. An element as defined in claim 1 including a longitudinal row of stitching adjacent said wire for retaining said corrugations in their folded state.

3. An element as defined in claim 1 wherein said elongated strip comprises a plurality of layers of material folded to form a multi-ply strip, all plies of which are jointly folded into the same corrugations.

4. An element as defined in claim 1 including an inner ply of filler material folded together with the buffing material.

5. An element as defined in claim 4 wherein said ply of filler material terminates short of the outer end of said corrugations.

6. An element as defined in claim 1 wherein said buffing material comprises a fabric embodying an abrasive material.

7. An element as defined in claim 1 wherein said buffing material comprises a fabric embdoying an abrasive material, and inner and outer shield members folded together with the abrasive material.

8. An element as defined in claim 1 including means for retaining said strip in corrugated and longitudinally compressed condition and comprising, a tubular core member having said element helically wound thereon with its folded edge engaging said core member, and a helical clamping element between convolutions of said strip, adjacent convolutions of said clamping element engaging opposite sides of said strip outwardly of said wire and clamping the same therebetween.

References Cited in the file of this patent

UNITED STATES PATENTS

| | | |
|---|---|---|
| 2,021,768 | Epp | Nov. 19, 1935 |
| 2,099,777 | Thomas | Nov. 23, 1937 |
| 2,140,208 | Murray | Dec. 13, 1938 |
| 2,141,235 | Angeletti | Dec. 27, 1938 |
| 2,236,444 | Peterson et al. | Mar. 25, 1941 |
| 2,468,686 | Sax | Apr. 26, 1949 |
| 2,500,690 | Lannan | Mar. 14, 1950 |
| 2,513,777 | Andre | July 4, 1950 |
| 2,627,146 | Lyon | Feb. 3, 1953 |
| 2,882,654 | Mockiewicz | Apr. 21, 1959 |